United States Patent [19]
Bates, Jr.

[11] Patent Number: 5,379,627
[45] Date of Patent: Jan. 10, 1995

[54] TESTER FOR MASS AIRFLOW SENSOR

[75] Inventor: James F. Bates, Jr., Fond du Lac, Wis.

[73] Assignee: A&E Manufacturing Co., Inc., Racine, Wis.

[21] Appl. No.: 892,785

[22] Filed: Jun. 3, 1992

[51] Int. Cl.$^6$ ............................................. G01F 25/00
[52] U.S. Cl. ........................................ 73/3; 73/118.1
[58] Field of Search .................................. 73/3, 118.1

[56] References Cited

U.S. PATENT DOCUMENTS

| | | | |
|---|---|---|---|
| 4,551,803 | 12/1985 | Hosaka et al. | 364/431.12 |
| 4,903,649 | 2/1990 | Staerzl | 73/118.2 |
| 5,124,919 | 6/1992 | Kastelle | 73/118.1 |

OTHER PUBLICATIONS

IBM Technical Disclosure Bulletin, "Airflow Sensor Testers", D. K. DeSilva, R. M. Dunn and N. Timko, Jr. vol. 21, No. 6 Nov. 1978, pp. 2281–2282.

*Primary Examiner*—Hezron E. Williams
*Assistant Examiner*—Daniel S. Larkin
*Attorney, Agent, or Firm*—Ryan, Kees & Hohenfeldt

[57] ABSTRACT

A device for testing the mass airflow sensor for a motor vehicle provides for connecting the positive and negative terminals of dc source to the corresponding positive and negative terminals on the mass airflow sensor. A circuit comprised of an LED and a resistor connected in series has one end connected to the positive terminal of the dc source and another end connected to the signal output terminal of the MAF sensor during a test. If, after the tester is connected to the dc source and to the MAF sensor the LED does not flash at all or burns continuously, it is a first indication of a defective MAF sensor. Because the flash or pulse rate of the signals driving the LED are too fast for visual counting, a tachometer or frequency meter is connected between the LED circuit and the negative terminal of the dc source. The meter needle deflects on a scale calibrated in terms of frequency or engine rpm which quantities are both related to mass airflow. The relationship between airflow variations as represented by the tachometer or frequency meter readings is determined by referring the meter readings to charts provided by the manufacturer of the mass airflow sensor.

3 Claims, 1 Drawing Sheet

TESTER FOR MASS AIRFLOW SENSOR

BACKGROUND OF THE INVENTION

The invention disclosed herein pertains to a tester for testing mass airflow (MAF) sensors that are commonly used on motor vehicles having a computer controlled engine performance system.

The MAF sensor is usually mounted in the vehicle between the air cleaner and the throttle plate assembly. The MAF sensor generates electric pulses at a rate or frequency proportional to the volume of the atmospheric air entering the engine intake manifold. In some designs, the MAF sensor also incorporates a temperature sensor to measure the temperature of the air entering the engine. A thermistor is usually used to sense the air temperature and may be positioned and associated with the MAF sensor or it may be located elsewhere on the vehicle.

A typical MAF sensor heats an element such as a wire or a foil that is disposed in the stream of air flowing into the engine. The temperature of the sensing element is controlled by the computer so that the element is always at a specific number of degrees warmer than incoming atmospheric air. The electric power required to maintain this elevated temperature is measured and translated into mass airflow by the computer. The computer uses the mass airflow value to calculate the amount of fuel required to maintain the desired air/fuel ratio to the engine. The MAF sensor assembly contains a voltage-to frequency converter that generates the square wave electric pulse train. Typical pulse rates or frequencies are about 30 Hz at idle speed and 150 Hz at wide open throttle.

SUMMARY OF THE INVENTION

A primary objective of the invention is to provide an inexpensive and easy to use tester for testing a mass airflow sensor.

Briefly stated, the new tester comprises a circuit that is energized by a nominally 12 volt source such as a 120VAC/12VDC inverter or the vehicle storage battery. The tester comprises three leads for connecting, respectively, to the positive (+), negative (−) and pulse signal output (S) terminals of the MAF sensor which can remain on the vehicle during testing. Two leads connect the tester to the vehicle battery. The signal circuit of the tester employs a light emitting diode (LED) connected in a series circuit with a current limiting resistor. An ordinary engine rpm indicating tachometer or a frequency measuring meter is connected by two leads between the series circuit and the negative terminal of the MAF sensor when a test is in progress. At the beginning of the test, if the MAF sensor is good, the LED will flash at a specific rate. At the same time the tachometer or frequency meter, if one is used in place of the tachometer, will read a specific value. Then, upon simply blowing air through the MAF sensor, it will respond, if it is good, by causing the LED to flash at a faster rate and the measurement exhibited on the scale of the tachometer or frequency meter will increase.

How the foregoing and other objectives and features of the invention are achieved will be evident in the more detailed description of the invention which will now be set forth in reference to the drawings.

DESCRIPTION OF A PREFERRED EMBODIMENT

Figure 1:
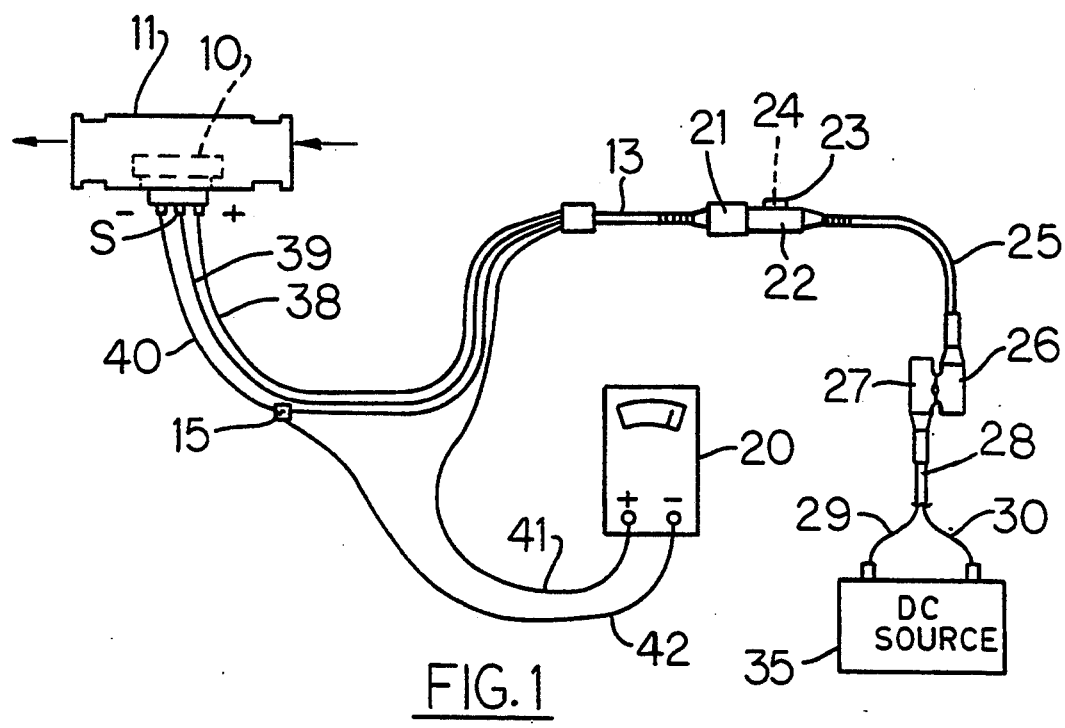
FIG. 1 shows the new MAF sensor tester connected for testing the mass airflow sensor of a motor vehicle.

In FIG. 1 the MAF sensor is symbolized by the element shown in hidden lines and identified by the reference numeral 10. The sensor is mounted in a tubular member 11 or thimble that is mounted between the air cleaner and the throttle plate assembly of the engine. The test device comprises three leads 38, 39 and 40. One lead 40 has a lead 42 connected to it by way of a splice connection 15. Two leads 41 and 42 are presently connected to the terminals of a meter 20 which may be a tachometer or a frequency meter. The four leads 38, 39, 40 and 41 emerge from a cord 13 that has a connector 21 at one end. Connector 21 is presently joined with a mating connector body 22. Leads 38–42 in the actual tester are terminated with alligator clips, not shown. A tubular element 23 projects from body 22. Element 23 has in its center, not visible in FIG. 1, an LED which can be visualized from outside of the connector. The LED in FIG. 1 is given the reference numeral 24. A two conductor cord 25 extends from connector body 22 and terminates in a connector 26. The latter is coupled to a connector 27 from which a two conductor cord 28 runs. Leads 29 and 30 in cord 28 are for connecting the test device to a nominally 12 volt source such as a 120VAC/12VDC adapter or a battery 35. The important thing is to have the body 22 available for housing connections in the circuitry and also providing a protected site for the LED 24.

Figure 2:
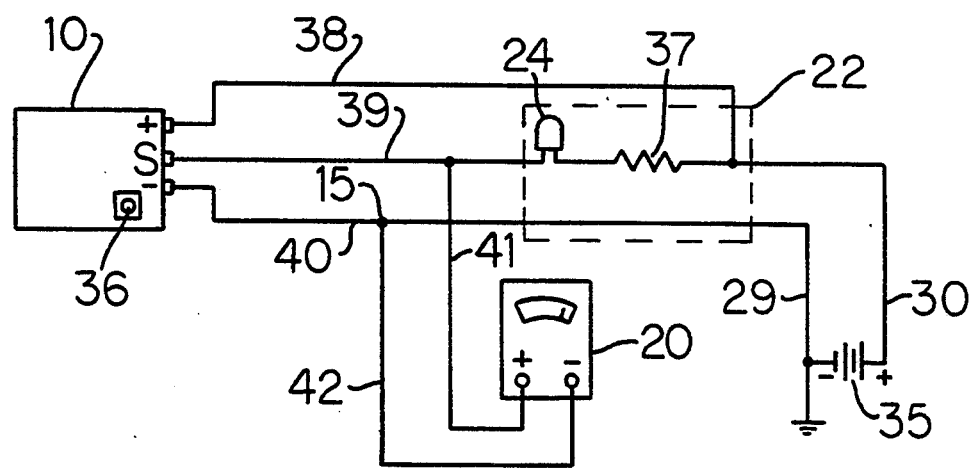
FIG. 2 is an electric circuit diagram of the MAF tester shown in conjunction with a temporarily connected frequency meter or tachometer as is the case when a MAF sensor test is underway with the new tester.

In FIG. 2, the circuit diagram MAF sensor 10 is represented by a rectangle that has three terminals identified by positive and negative signs and a terminal marked S which is the pulse signal output terminal of the sensor. An air temperature sensor is symbolized by a square marked 36. The temperature sensor may or may not be directly associated with the MAF sensor but for the computer to obtain an accurate calculation of the amount of fuel required to maintain the proper air/fuel ratio for the engine, it is usually necessary to correct the airflow for changes in the density of air at different temperatures.

In FIG. 2, the new tester has a current limiting resistor 37 connected in series with LED 24. The LED and resistor are contained within connector body 22 which is represented by a dashed line rectangle in FIG. 2. The line containing series connected LED 24 and resistor 37 is connected by way of lead 30 to the positive terminal of nominally 12 volt dc source 35 and the other end of the series circuit is connected by way of lead 39 to the signal terminal S of the MAF sensor 10 and by way of lead 41 to a terminal of meter 20. Lead 38 is connected during a sensor test to the positive (+) terminal of the MAF sensor 10 and directly to the positive (+) terminal of dc source 35. The negative (−) terminal of MAF sensor 10 connects directly to the negative (−) terminal of dc source 35 by way of lead 40 and a line 29. The lead 42 by which meter 20 is connected to the tester connects to lead 40.

In FIG. 2, everything is connected for performing the MAF sensor functional integrity test. As soon as the connections to dc source 35 are made, LED 24 will begin to flash at a rate corresponding to the frequency or rate of the pulses emitted on the signal line S by MAF sensor 10. Actually what happens is the S terminal switches to a logical low state at a repetition rate representative of air flow rate. This allows the LED to conduct and flash at a corresponding rate. The meter 20 converts pulse rate or frequency to a numerical value that can be read from its scale. Visual signals from the LED are useful to the person using the tester. If the output transistor, not shown, in the MAF sensor 10 is defective, LED 24 will either turn on and remain on or will not flash at all. In such case, the test can be discontinued because it will be evident that replacement of the MAF sensor is necessary.

If when the test is begun, the LED flashes, it will flash at a specific frequency or rate. Much of the time the pulse rate or frequency is too high to permit counting the pulses per unit of time by observing corresponding flashes of the LED. Hence, it is necessary to resort to either a tachometer instrument or a frequency meter. Assume first that the meter 20 is being used for test purposes and it is a tachometer. It has been discovered that even though the LED is not the ultimate element used for indicating the frequency or pulse rate of the MAF sensor output signal, the LED is essential to operation of the circuit. If the LED 24 is shunted, for example, the tachometer reading will be zero regardless of the output signal level from the MAF sensor 10. As long as the MAF sensor 10 drives the LED a reading of the frequency or pulse rate can be obtained from the meter 20. Of course, the pulse rate is proportional to engine rpm as if the engine were running so the tachometer 20 can be calibrated in terms of rpm as it is for general use as an engine rotational speed indicator or it can be calibrated for especially testing devices such as the MAF sensor 10 by calibrating it in terms of frequency (Hz) which corresponds to the pulse rate. If it is calibrated in Hertz, the user must refer to a conversion chart provided by the manufacturer of the MAF sensor to determine the relationship between pulse rate and mass airflow. The new test device will be found to be especially useful by the do-it-yourself mechanic who may only have a tachometer which allows him to read out of engine rpm only. A manufacturer's table must be referred to then to convert rpm to frequency or pulse rate and mass airflow.

It should be mentioned that the MAF sensor 10 should be allowed to warmup for three to five minutes before beginning the test. As was indicated earlier, the tester will have some kind of an element which must be heated and subjected to cooling by ambient air for it to operate properly. After those parts of the test mentioned above have been completed, the user of the tester can provide a stream of air with a suitable appliance or simply blow through the tube 11 containing the MAF sensor to determine if the pulse rate increases correspondingly with the increase in the volume of air provided by the breath. If there is an increase in pulse rate and in the meter 20 reading, the MAF sensor 10 is testing good. Of course, if there is no increase in pulse rate corresponding with increased airflow over the MAF sensor 10 in the thimble 11 when airflow is increased by blowing through the thimble, the MAF sensor is defective and must be replaced to get optimum engine performance.

If, alternatively, a frequency meter 20 is used in place of a tachometer, it will be calibrated in terms of frequency and the frequency can be read off of the scale at the position of the needle of the meter. When a frequency meter is used, it is not necessary to make a conversion. It is only necessary to compare the pulse rate or frequency variations with the airflow quantity as indicated on a chart provided by the manufacturer of the MAF sensor.

Although a preferred embodiment of the invention has been described in detail, such description is intended to be illustrative rather than limiting, for the invention may be variously embodied and is to be limited only by interpretation of the claims that follows.

I claim:

1. A method of testing a mass airflow sensor comprising the steps of:
   connecting the positive polarity terminal of the sensor to the positive terminal of a dc power source,
   connecting the negative polarity terminal of the sensor to the negative terminal of the dc power source,
   connecting a circuit comprised of a resistor in series with an LED between said positive terminal of the dc source and the signal (S) terminal of said sensor,
   such that if after said connections are made said LED flashes, one indication of a good sensor is provided, and
   after said connections are made, blowing air on the sensor to determine if the flashing rate of said LED changes with changes in air flow.

2. A method of testing a mass airflow sensor comprising the steps of:
   connecting the positive polarity terminal of the sensor to the positive terminal of a dc power source,
   connecting the negative polarity terminal of the sensor to the negative terminal of the dc power source,
   connecting a circuit comprised of a resistor in series with an LED between said positive terminal of the dc source and the signal (S) terminal of said sensor,
   such that if after said connections are made said LED flashes, one indication of a good sensor is provided,
   connecting a tachometer meter between the signal terminal of the sensor and the negative polarity terminal of the sensor for the meter to provide a readable value that is representative of the rate of the pulses appearing on said signal terminal, and
   after said meter is connected, blowing air on said sensor to determine if the value readable on the meter changes with changes in air flow.

3. A method of testing a mass airflow sensor comprising the steps of:
   connecting the positive polarity terminal of the sensor to the positive terminal of a dc power source,
   connecting the negative polarity terminal of the sensor to the negative terminal of the dc power source,
   connecting a circuit comprised of a resistor in series with an LED between said positive terminal of the dc source and the signal (S) terminal of said sensor,
   such that if after said connections are made said LED flashes, one indication of a good sensor is provided,
   connecting a frequency meter between the signal terminal of the sensor and the negative polarity terminal of the sensor for the meter to provide a readable value that is representative of the frequency of the signal appearing on said signal terminal, and
   after said meter is connected, blowing air on said sensor to determine if the value readable on the meter changes with changes in air flow.

* * * * *